Figure 4:
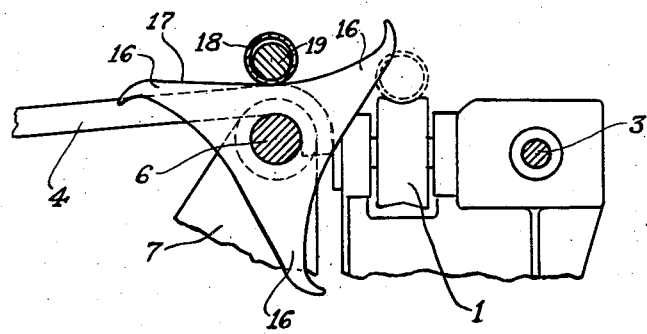

Dec. 17, 1935.  A. P. DIESCHER  2,024,513
TRANSFER MECHANISM
Filed Jan. 26, 1933  3 Sheets-Sheet 1
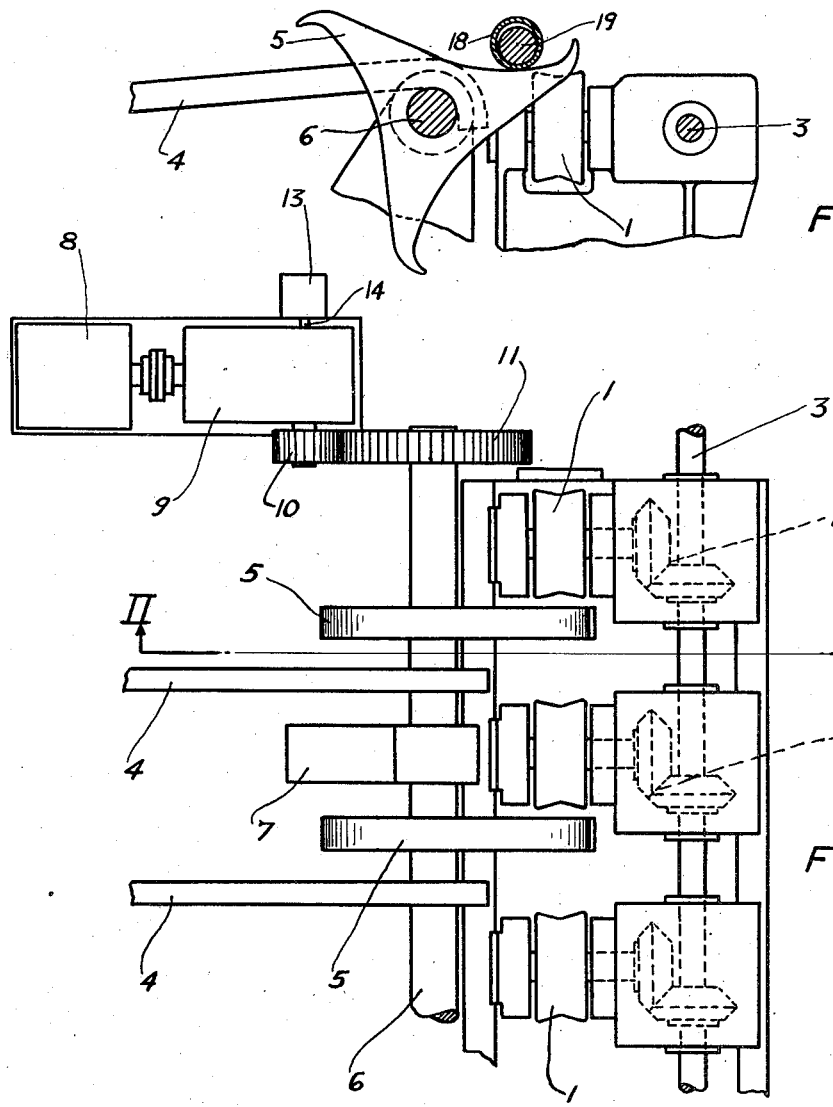
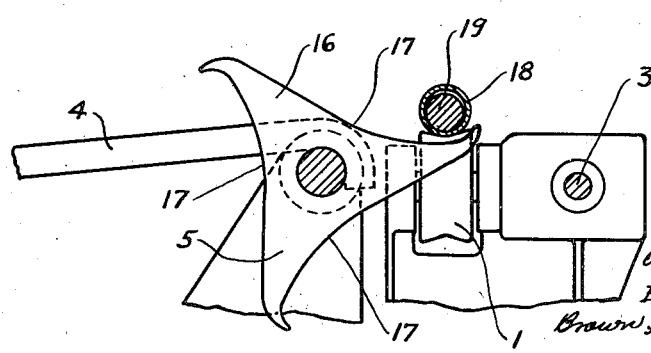
INVENTOR
August P. Diescher
BY
Brown, Critchlow & Flick
ATTORNEYS Dec. 17, 1935.  A. P. DIESCHER  2,024,513
TRANSFER MECHANISM
Filed Jan. 26, 1933   3 Sheets-Sheet 3

INVENTOR
August P. Diescher
BY
Brown, Critchlow & Flick
ATTORNEYS

Patented Dec. 17, 1935

2,024,513

UNITED STATES PATENT OFFICE 2,024,513

TRANSFER MECHANISM

August P. Diescher, Pittsburgh, Pa., assignor to Diescher Tube Mills, Inc., Pittsburgh, Pa., a corporation of Delaware Application January 26, 1933, Serial No. 653,626

10 Claims. (Cl. 80—48)

My invention relates to apparatus for handling tubes, pipes, rods or similar articles, and it relates particularly to transfer or "throw-out" mechanisms for transferring tubes such as seamless tubes from a receiving table to suitable or convenient means for cooling and storage or to other apparatus for further treatment.

In the operation of moving relatively hot tubes with comparatively thin walls from receiving tables therefor, it is necessary to transfer such tubes without severe shock or jar in order to avoid deforming the walls thereof. Care is particularly necessary when the pipe or tube contains a mandrel which is usually of such weight that damage is almost certain to occur when the tube is roughly handled.

Transfer or throw-out mechanisms of the prior art have usually been in one of two forms. One form is that of a single oscillating arm which must necessarily move quickly in order to complete its cycle to clear the path for the succeeding pipe.

Another form has been that of a rotatable member having two diagonally opposite arms the operation of which has a number of disadvantages. For example, it is likely that in its stationary position the engaging arm must be relatively distant from the tube that is to be engaged thereby, and in such case the arm will have attained high speed before it engages the tube and the latter may be dented by the resulting impact. Any attempt to arrange the stationary position of one of the arms closely adjacent to the tube or pipe may result in the tube that has just been transferred being caught between the upper arm and the skids to which it has been transferred.

In accordance with the present invention I provide throw-out or transfer devices having three arms spaced substantially 120° apart. This arrangement avoids the disadvantages of devices having one or two arms. It is possible to arrange the stationary position of the throw-out such that one of the arms is closely adjacent to the tube next to be engaged which insures that the tube will be engaged before the arm has attained any considerable speed. The provision of three arms arranges that the arm that has transferred a tube from the receiving table to the skids remains in an approximately vertical position above the latter during the succeeding stationary period, and there is accordingly no danger of clamping or damaging a tube between the arms and the skids.

Figure 5:
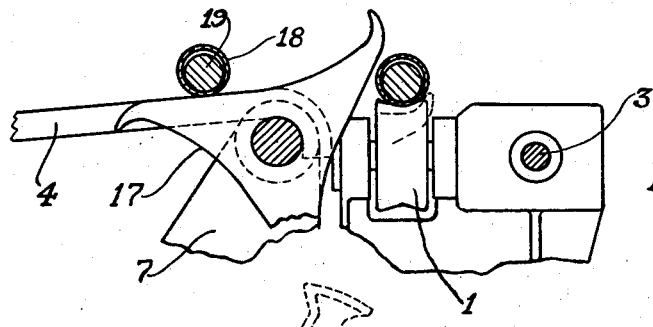
Figure 6:
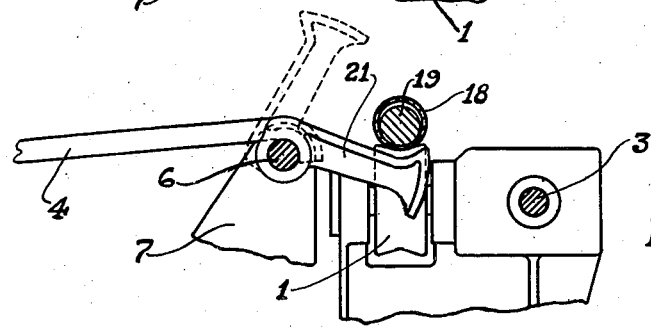
Figure 7:
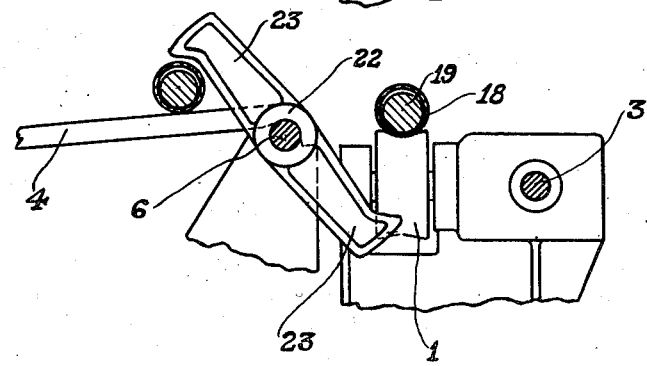

Other constructional and operative advantages will be apparent in the description of the details of my invention in connection with the accompanying drawings, in which Fig. 1 is a plan view of a portion of a roller table and associated apparatus; Fig. 2 is a vertical sectional view taken on the line II—II of Fig. 1; Fig. 3 is a similar view showing certain of the apparatus in a different position; Figs. 4 and 5 are views similar to Fig. 2 showing the apparatus in progressive positions; Fig. 6 is a view similar to Fig. 2 showing a throw-out with a single arm; and Fig. 7 is a similar view illustrating a throw-out with two arms. Figs. 8, 9, 10, and 11 are views similar to Figs. 2 to 5, illustrating a modified form of skids for receiving transferred pipes.

Referring particularly to Fig. 1, a series of table rollers 1 is adapted to receive thereon seamless tubes or pipes from a mill and that may have relatively thin hot walls. The rollers 1 are driven by means of bevel gear mechanisms 2, all of which are driven by a common shaft 3 that may be connected to any suitable motor or other power device (not shown).

Skids 4 consisting of inclined bars extend at right angles to the longitudinal path of the tubes upon the rollers 1. A series of throw-out devices or transfer members 5, of which two are shown in Fig. 1, are mounted upon a shaft 6 having a bearing 7. The shaft 6 is driven by a motor 8, a gear set 9, a pinion 10, and a gear 11 that is mounted on the shaft 6. The teeth of the pinion 10 and the gear 11 are so proportioned that one revolution of the pinion 10 rotates the gear 11 through 120° or one-third of a revolution.

A limit switch 13 mounted upon shaft 14 of the pinion 10 stops the motor and the mechanism driven thereby at the completion of each revolution of the pinion 10, or each third of a revolution of the gear 11, and the transfer devices driven thereby. The starting of the motor 8 may be controlled by a suitable switch (not shown) actuated by a tube upon the rollers 1. The several switches and means for controlling the motor 8 are not illustrated as the operation described in connection therewith is standard practice and constitutes no part of the present invention.

As shown in Fig. 2, each of the throwout devices 5 comprises three substantially radial arms 16 each of which is connected to the other two arms by a continuous concave or recessed surface 17. The throw-out 5 may be of unitary construction as shown, or the three arms may be separate parts that are suitably secured to a hub, as will be readily appreciated.

Also, while a substantially concave surface has been shown and described as connecting each arm with the others, this surface may, if desired, consist of a series of straight or curved portions at suitable angles, or in desired combinations, to form a reentrant surface to secure the desired effect on the tubes to be transferred, and it is not in all cases necessary that the forward or tube-supporting side of the arms shall be continuous with the trailing side of the adjacent arm. In some cases the tube-supporting surface of the arms, or, as it may be, the continuous surface of adjacent arms, may extend in straight lines. In any of the forms or combinations of surfaces referred to above, however, it is preferable to provide each arm with a suitable hook to enable it to pick up a tube without the latter rolling off the end of the arm.

As shown in Fig. 2, the skids 4 have curved ends adjacent the table rollers 1, and these curved portions are concentric with the axis of rotation of the throw-outs and coincide in part with the path of the intermediate portions of the surfaces 17. The arms may thus be said to have an inner portion of their supporting surface substantially in a plane tangent to the curve of the skid ends. The stationary positions of the throw-out members 5 are shown in Fig. 2.

It may be assumed that a tube 18 having a mandrel 19 therein has moved along the table rollers 1 into position to be transferred to the skids 4. The usual trip switch has been operated to start the motor 8, and it operates through the mechanism described above to rotate the throw-out members 5. It will be noted that as shown in Fig. 2 the horizontally extending arm 16 is closely adjacent to the tube 18, insuring that the latter will be engaged before the arm has attained any material speed.

The tube 18 and the mandrel 19 will be lifted by the throw-out 5 from the rollers 1 and will begin to roll along the surfaces 17 to the left, as shown in Fig. 3. This movement of the tube 18 and mandrel 19 will continue through the successive positions shown in Figs. 4 and 5.

It will be noted that the transition from the concave surface 17 of the throw-out 5 to the skids 4 will be gradual and without shock, because the movement of the tube 18 and mandrel has been retarded by reason of the form of the surface upon which it travels, and which insures that the position of the tube is dependent upon the angular position of the arm 16. Furthermore, the path of the tube coincides in part with the curved ends of the skids 4, and thus insures that the tube 18 does not make any abrupt change in its direction.

When the tube 18 is in the position illustrated in Fig. 5, its weight is now supported by the skids 4 and the arm 16 may be rotated until the succeeding arm is in a position corresponding to that illustrated in Fig. 2. The limit switch 13 will again bring the motor 8 and the mechanism driven thereby to rest until the trip switch is actuated by the succeeding tube, whereupon the operation described above will be repeated. The arm that engages the tube in the operation described above remains somewhat beyond a vertical position with respect to the shaft 6, but it does not pass the plane of the skids 4, and there is no likelihood therefore of the tube being clamped between this arm and the skid 4.

During the transfer of a tube in the manner described above another tube may be received by the rollers 1 just as soon as the arms for engaging the previous pipe have passed out of alignment with the longitudinal path of the tube upon the rollers 1. Accordingly this arrangement provides that the arms of the throw-out do not interfere with the travel of tubes succeeding those being transferred and the arms can not interfere with the movements of tubes that have been transferred to the skids.

In Fig. 6 a typical arrangement of the prior art comprises a mechanism with a single arm 21 which oscillates between the position in which it is illustrated and the uppermost position indicated by dotted lines. It will be obvious that the tube 18 traveling down the inclined surface of the arm 21 changes its direction abruptly when it reaches the skids 4 and there is no concave surface or other means for retarding the movement of the tube.

In addition, it is necessary to actuate the arm 21 at relatively high speed because it is necessary for it to return to its full line position in readiness for the succeeding tube. If the arms 21 are operated relatively slowly it is possible that the succeeding tube will have arrived on the rollers 1, and the result will be either to damage the pipe or to cause breakage of the throw-out mechanism.

In the arrangement of Fig. 7 a throw-out device 22 is provided with two arms 23, the stationary positions of which must be that shown in Fig. 7 in order to avoid interference with the tube that has been discharged or transferred as clearly shown in the drawings. It will be necessary therefore for the arm for engaging a tube to travel through a relatively long distance and the arm will have acquired considerable speed, with the result that a relatively heavy impact against the walls of the tube may cause the latter to be dented or otherwise deformed. This form of mechanism is also subject to the disadvantage that the tube will roll rapidly down the inclined surface of the arms and will abruptly change its direction upon striking the skids 4.

In the apparatus illustrated in Figs. 8, 9, 10, and 11, the throw-out 5 is shown in progressive positions in lifting a tube 18 and contained mandrel 19 over an elevated portion or hump 25 of a skid 26. The purpose of the hump 25 is to secure more rapid travel of the transferred tube, and this is accomplished by its acceleration down the reverse slope of the hump almost immediately after it is in the position shown in Fig. 5. The height of the hump regulates the speed of the tubes.

In this form of apparatus, the surfaces of the skids do not conform to the surfaces 17 of the arms 16 upon which the pipes roll as they are being transferred, but the shapes of the surfaces 17 so control the progress of the tubes that no severe shock is sustained by them in engaging the skids 26. Obviously, if the upper end portion of the skids at the point where the tubes are delivered from the transfer devices are curved concentrically about the axis of rotation of the transfer devices and the tube-engaging sides of the arms of the transfer devices are shaped to extend, at the point from which the tubes are delivered to the skids, substantially in a plane tangent to the curve of the adjacent skid end portions, then there will be no sudden change in the direction of movement of the tubes as they are delivered from the transfer devices to the skids, and the tubes will not be liable to damage even though the supporting surfaces of the arms are not curved so as to control the progress of the tubes thereon.

Figure 8:
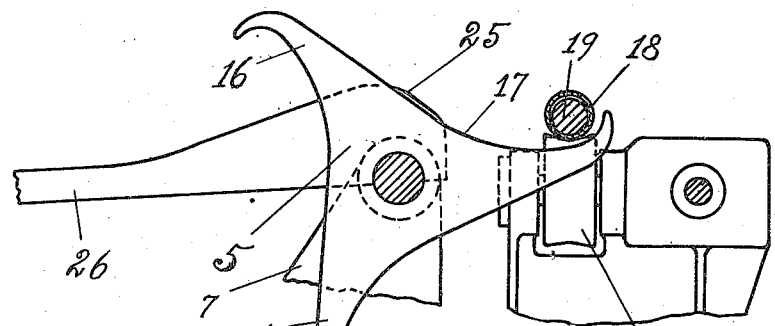

In Fig. 8 the throw-out 5 is shown in its position of rest or initial position which it occupies while the tube 18 completes its movement along the table rollers 1 to actuate the usual trip switch.

Figure 9:
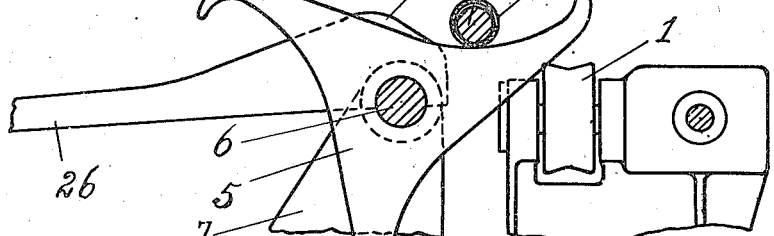

Fig. 9 shows the throw-out 5 in the position in which the tube 18 has rolled down into the hollow or concave portion of the arm 16, and which will retard the movement of the tube 18 before it strikes the hump 26.

Figure 10:
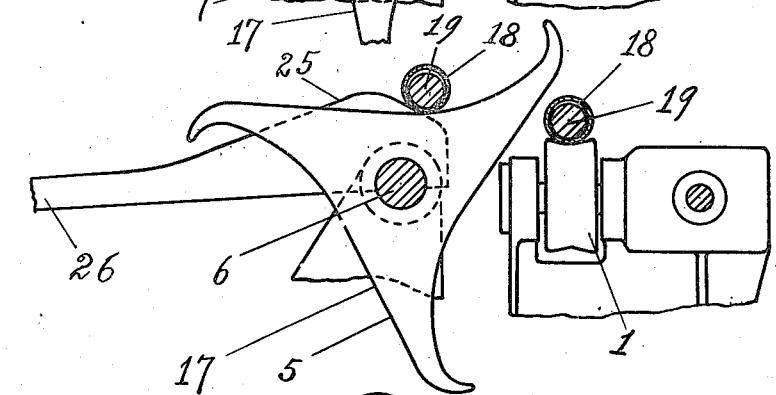

In Fig. 10 the tube 18 has engaged the hump and has been lifted somewhat above the position of Fig. 9. Also, the lifting arm 16 has now cleared the line of table rollers 1 and the next tube may move under the arm towards its transfer position.

Figure 11:
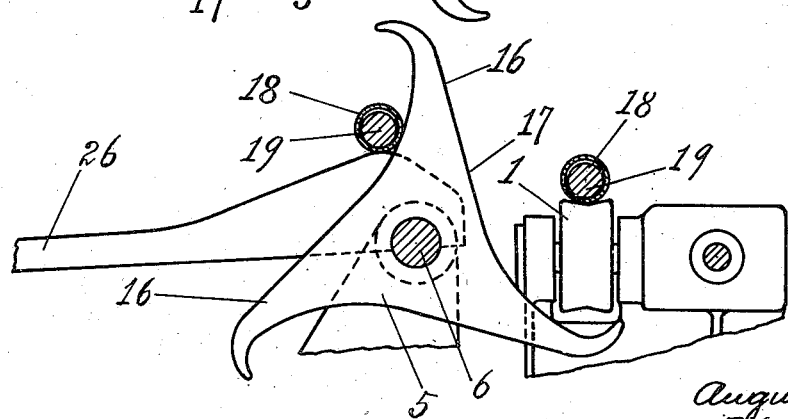

Fig. 11 shows the tube 18 in substantially its uppermost position prior to its rolling down the reverse slope of the hump 26. The throw-out will continue its movement until it reaches its succeeding stationary position corresponding to that of Fig. 8.

It will be noted that the disadvantages of prior art devices are avoided by the provision of a throw-out having three arms uniformly spaced from each other. Each of the arms travels a very short distance before it engages the tube, and the latter, if the arms are concavely curved, travels at a controlled speed in accordance with the speed of rotation of the throw-out device.

The arms do not go through the plane of the skids while a tube is being discharged along the skids within the radius of the arms. The tube is transferred between two substantially horizontal positions without shock or jar either because of control of the speed at which it is delivered onto the skids or because it is delivered onto the skids without abrupt change in direction, or for both reasons, which insures that a relatively hot tube having thin walls, and either with or without a mandrel, may be handled without danger of deformation of the tube or marring of its surfaces.

The foregoing and other advantages will be apparent to those skilled in the art of manufacturing and handling of pipes and tubes.

I claim:

1. Mechanism for handling tubes or the like, comprising means for supporting tubes, inclined members for conveying pipes laterally disposed adjacent said supporting means with their upper ends extending slightly thereabove, and transfer mechanism for conveying tubes from the supporting means to the inclined members, said transfer mechanism comprising a plurality of simultaneously rotatable members, each of said members having three radial arms which are joined together by continuous concave surfaces and which convey tubes engaged by said arms, said inclined members having end portions coinciding in part with the circular path of an intermediate portion of said concave surfaces whereby a tube may be transferred from one of said surfaces to said inclined members without shock or jar.

2. Mechanism for handling tubes and the like, comprising a receiving table formed by a plurality of spaced supports on which the tubes are advanced longitudinally, a plurality of spaced skids which slope downwardly from points near and slightly above said table, a plurality of transfer devices rotatable about an axis parallel to said table for transferring tubes from the table to the skids, each transfer device having three transfer arms substantially equally angularly and joined together by continuous concave surfaces which move upwardly between the table supports and downwardly between the upper end of the skids and are adapted to engage a tube on the supports at points in substantial alignment with the points where the tube contacts the supports and cause it to roll along the surfaces of the arms from one to the other onto the receiving table as the arms are rotated, and means for turning said transfer devices intermittently for one-third of a revolution at each turning movement.

3. Mechanism for handling tubes and the like, comprising a receiving table formed by a plurality of spaced supports on which the tubes are advanced longitudinally, a plurality of spaced skids which slope downwardly from points near said table, a plurality of transfer devices rotatable about an axis parallel to said table for transferring tubes from the table to the skids, each transfer device having three transfer arms substantially equally spaced angularly which move upwardly between the table supports and downwardly between the upper end of the skids, and means for turning said transfer devices intermittently for one-third of a revolution at each turning movement, the upper end portions of the skids being curved concentrically about the axis of rotation of the transfer devices and the tube-engaging side of each of said arms being shaped to provide a supporting surface an inner portion of which extends substantially in a plane tangent to the curve of the adjacent skid end portions.

4. A transfer apparatus for handling tubes or the like comprising a conveyor for transporting a tube endwise, an inclined skid structure located at the side of said conveyor, and a plurality of three armed star wheels concentrically arranged in axially spaced relation for rotation between said skid structure and said conveyor, the arms of said wheels being joined together by continuous concave surfaces and so disposed that when rotated they engage a tube resting on said conveyor at points in substantial alignment with the points where the tube contacts the conveyor and lift it off the conveyor and at the same time cause it to roll laterally along the surfaces of the adjoining wheel arms onto said skid structure.

5. A transfer apparatus according to claim 4 characterized by the arms of said star wheels being arranged in equally spaced angular relation and the tube contacting surface at the inner ends thereof being shaped to provide a tube supporting surface which extends substantially in a plane tangential to a circle of which the center is the axis of rotation of the arms and the radius of which is substantially equal to the distance between the center of said star wheels and the surface of the skid structure at the end thereof adjacent the conveyor.

6. A transfer apparatus according to claim 4 characterized by the arms of said star wheels being arranged in equally spaced augular relation and having substantially continuous surfaces therebetween whereby a tube is engaged by the forward side of one arm and rolls along one of said surfaces and is discharged onto said skid structure from the trailing side of the immediately preceding arm.

7. A transfer apparatus for handling tubes or the like comprising a conveyor for transporting a tube endwise, a skid structure located at the side of said conveyor, and a plurality of star wheels arranged in axially spaced relation between said skid structure and said conveyor and so disposed that when rotated the arms thereof are adapted to lift a pipe from the conveyor and convey it laterally onto the skid structure and the arms of said star wheels having substantially continuous surfaces therebetween whereby a tube is engaged by the forward side of one arm and rolls along one of said surfaces and is discharged onto said skid structure from the trailing side of the immediately preceding arm.

8. A transfer apparatus according to claim 4 characterized by said arms being spaced at angles of 120° and having continuously recessed surfaces therebetween, and upon which a tube rolls during its transfer from the conveyor to the skid structure before the engaging arms reach the plane of the skid structure.

9. A transfer apparatus according to claim 4 which also includes means for rotating said star wheels and means for automatically stopping said rotating means each time one set of arms of said wheels is directly below but adjacent to the supporting level of said conveyor.

10. A transfer apparatus according to claim 4 in which the outer ends of the arms of the star wheels are inclined upwardly sufficiently to prevent a tube rolling backwardly off the wheels when it is being lifted thereby from the conveyor.

AUGUST P. DIESCHER.